(12) United States Patent
Shiohara

(10) Patent No.: US 12,554,511 B2
(45) Date of Patent: Feb. 17, 2026

(54) STORAGE MEDIUM, INFORMATION PROCESSING METHOD, AND INFORMATION PROCESSING APPARATUS

(71) Applicant: CANON KABUSHIKI KAISHA, Tokyo (JP)

(72) Inventor: Tetsuya Shiohara, Nagano (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 18/358,810

(22) Filed: Jul. 25, 2023

(65) Prior Publication Data
US 2024/0034070 A1    Feb. 1, 2024

(30) Foreign Application Priority Data
Jul. 29, 2022 (JP) ................................. 2022-121180

(51) Int. Cl.
G06F 9/445 (2018.01)
G06F 9/451 (2018.01)
B41J 2/175 (2006.01)

(52) U.S. Cl.
CPC .......... *G06F 9/44505* (2013.01); *G06F 9/451* (2018.02); *B41J 2002/17589* (2013.01)

(58) Field of Classification Search
CPC ................. G06F 9/44505; G06F 9/451; B41J 2002/17589
See application file for complete search history.

(56) References Cited

U.S. PATENT DOCUMENTS

| 2009/0168096 | A1* | 7/2009 | Toda ..................... G06F 3/1288 358/1.15 |
| 2012/0050359 | A1* | 3/2012 | Koganehira ......... B41J 2/17566 347/6 |
| 2022/0342614 | A1* | 10/2022 | Hosomizo ............. G06F 3/1285 |
| 2022/0360608 | A1* | 11/2022 | Raleigh ............... H04L 47/2408 |

FOREIGN PATENT DOCUMENTS

| JP | 2019074906 A |   | 5/2019 |             |
| JP | 2019101690 A | * | 6/2019 | ......... H04N 1/00832 |
| JP | 2022118054 A | * | 8/2022 |             |

OTHER PUBLICATIONS

Translation of JP-2022118054-A (Year: 2022).*
JP-2019101690-A translation (Year: 2019).*
JP-2022118054-A translation (Year: 2022).*

* cited by examiner

*Primary Examiner* — Henry Tsai
*Assistant Examiner* — John B Roche
(74) *Attorney, Agent, or Firm* — Canon U.S.A., Inc. IP Division

(57) ABSTRACT

An information processing method for an information processing apparatus including an application configured to extend a function provided by a print data generation software for generating print data to be printed by a plurality of printing devices includes obtaining information about a printing device connected to the information processing apparatus, and causing a display to display, in a case where the obtained information indicates a certain type printing device, information based on a type of the certain type printing device.

15 Claims, 17 Drawing Sheets

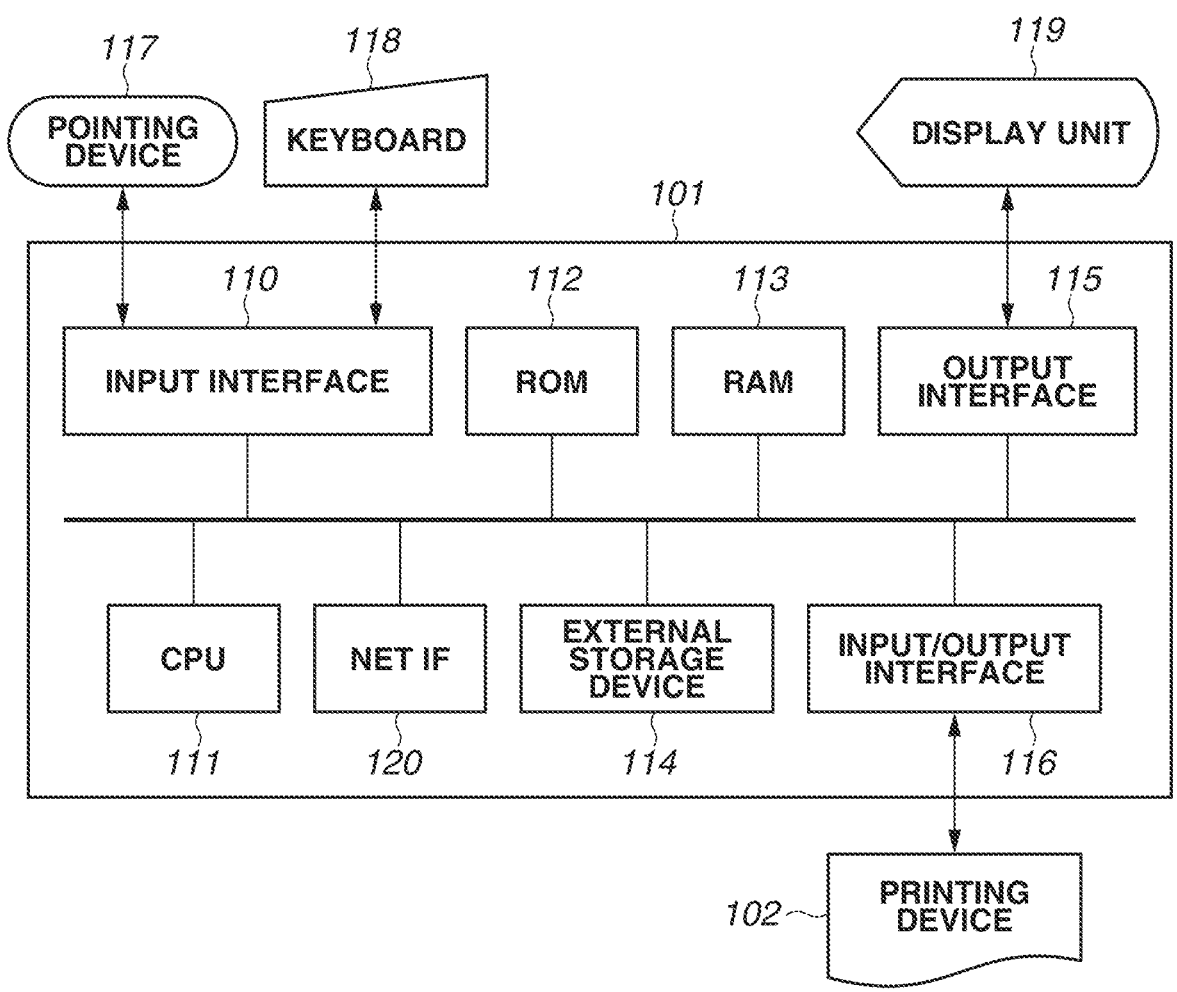

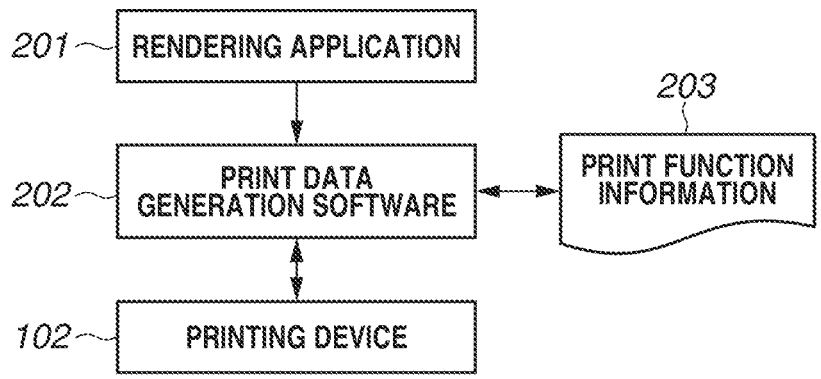
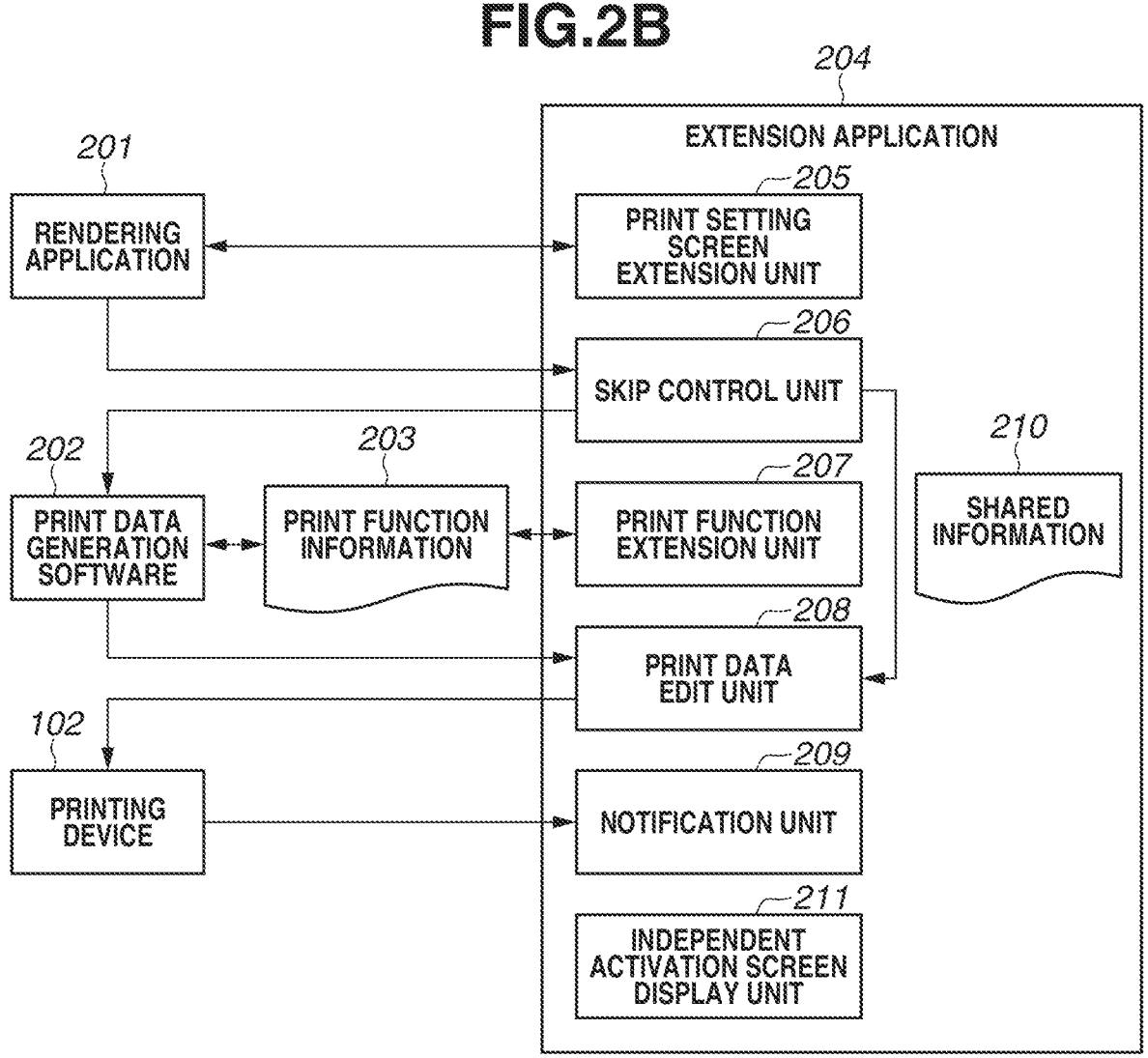

FIG.5A

- 500 (window)
- 501 ⓘ
- 502 SHEET TYPE: PLAIN PAPER
- 503 SHEET SIZE: A4
- 504 PRINT ORIENTATION: ● PORTRAIT ○ LANDSCAPE
- 505 SHEET TRAY: AUTOMATIC SELECTION
- 506 ☑ PRINT FROM LAST PAGE
- 507 ☐ BORDERLESS
- 508 DOUBLE-SIDED PRINTING: SINGLE-SIDED PRINTING
- 510 CANCEL
- 509 OK

SHEET SIZE
[A4 ▼] — 503

PRINT ORIENTATION
[A] ● PORTRAIT   [A] ○ LANDSCAPE — 504

SHEET TYPE
[PLAIN PAPER ▼] — 502

SHEET TRAY
[AUTOMATIC SELECTION ▼] — 505

☐ PRINTING IN WIDER PRINT AREA — 511

STAPLING
[UPPER LEFT ▼] — 512

PUNCHING
[NONE ▼] — 513

DOUBLE-SIDED PRINTING
[SINGLE-SIDED PRINTING ▼] — 508

[CANCEL] — 510   [OK] — 509

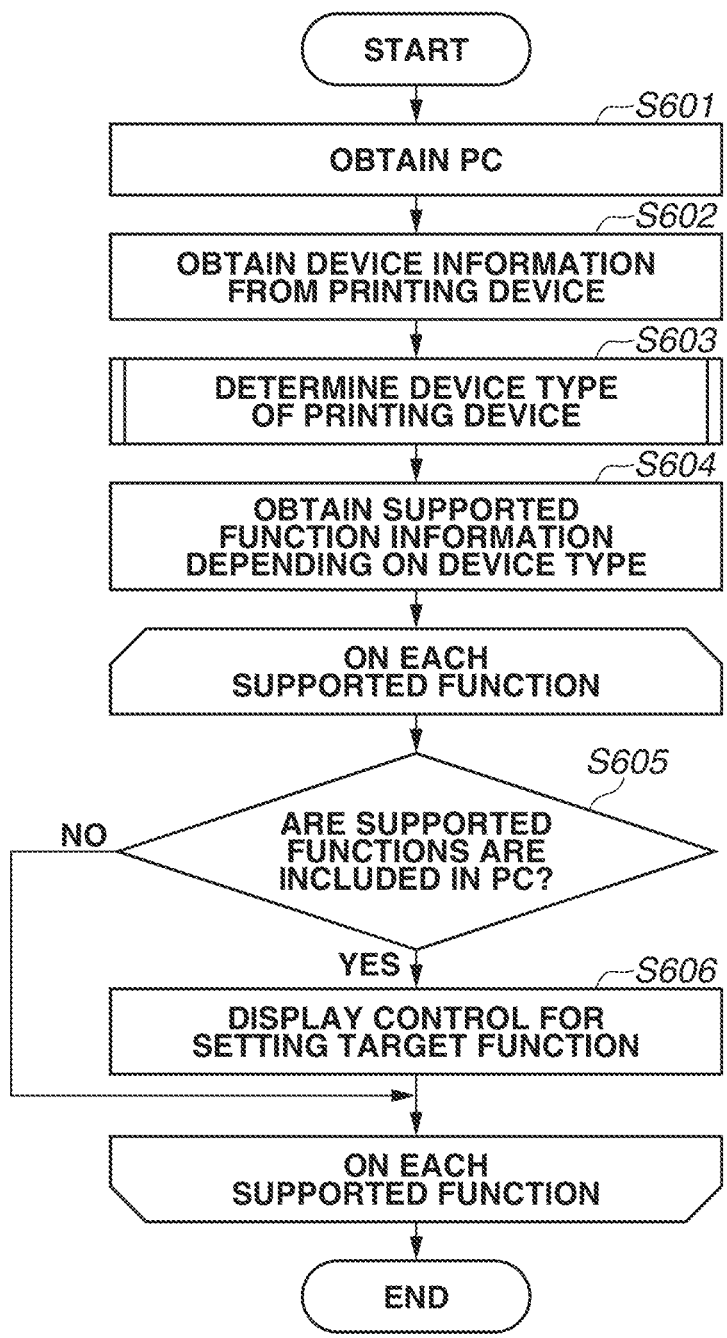

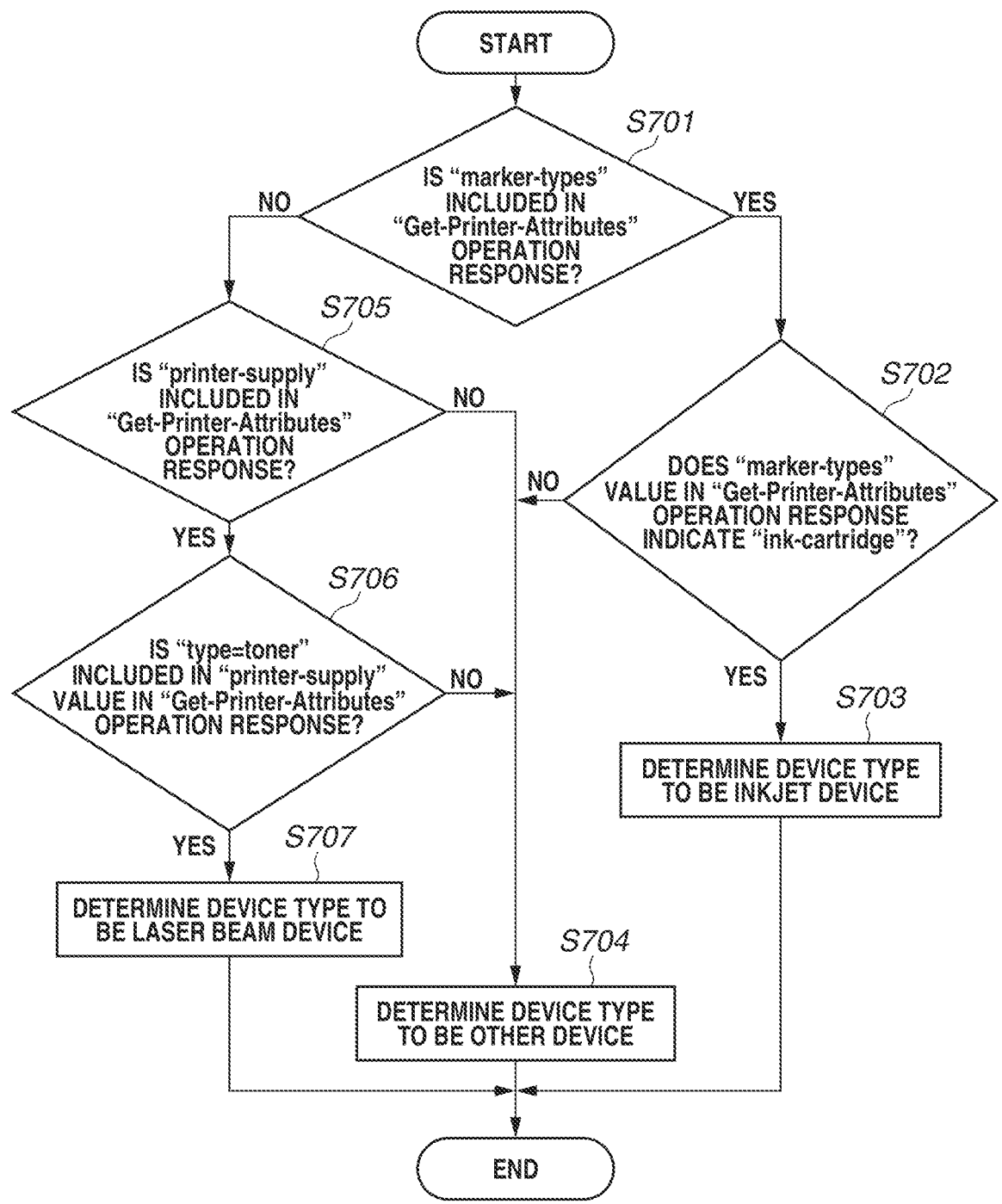

FIG.8

```
<psf:PrintCapabilities ...>
 <psf:Feature name="psk:PageMediaSize">
 ...
  <psf:Option name="psk:NorthAmericaLetter" constrained="psk:None">
   <psf:ScoredProperty name="psk:MediaSizeWidth">
    <psf:Value xsi:type="xsd:integer">215900</psf:Value>
   </psf:ScoredProperty>
   <psf:ScoredProperty name="psk:MediaSizeHeight">
    <psf:Value xsi:type="xsd:integer">279400</psf:Value>
   </psf:ScoredProperty>
  </psf:Option>
  <psf:Option name="psk:NorthAmericaLetter" constrained="psk:None">
   <psf:ScoredProperty name="psk:ISO A4">
    <psf:Value xsi:type="xsd:integer">210000</psf:Value>
   </psf:ScoredProperty>
   <psf:ScoredProperty name="psk:MediaSizeHeight">
    <psf:Value xsi:type="xsd:integer">297000</psf:Value>
   </psf:ScoredProperty>
  </psf:Option>
 </psf:Feature>
 <psf:Feature name="psk:PageMediaType">
 ...
  <psf:Option name="psk:Plain" constrained="psk:None"/>
  <psf:Option name="psk:PhotoPaper" constrained="psk:None"/>
 </psf:Feature>
 <psf:Feature name="psk:PageOrientation">
 ...
  <psf:Option name="psk:Portlait" constrained="psk:None"/>
  <psf:Option name="psk:Landscape" constrained="psk:None"/>
 </psf:Feature>
<psf:Feature name="psk:JobNUpAllDocumentsContiguously">
  <psf:Option name="ns0000:None" constrained="psk:None"/>
  <psf:Option name="ns0000:PagePerSheet_2" constrained="psk:None"/>
  <psf:Option name="ns0000:PagePerSheet_4" constrained="psk:None"/>
 </psf:Feature>
 ...
</psf:PrintCapabilities>
```

800

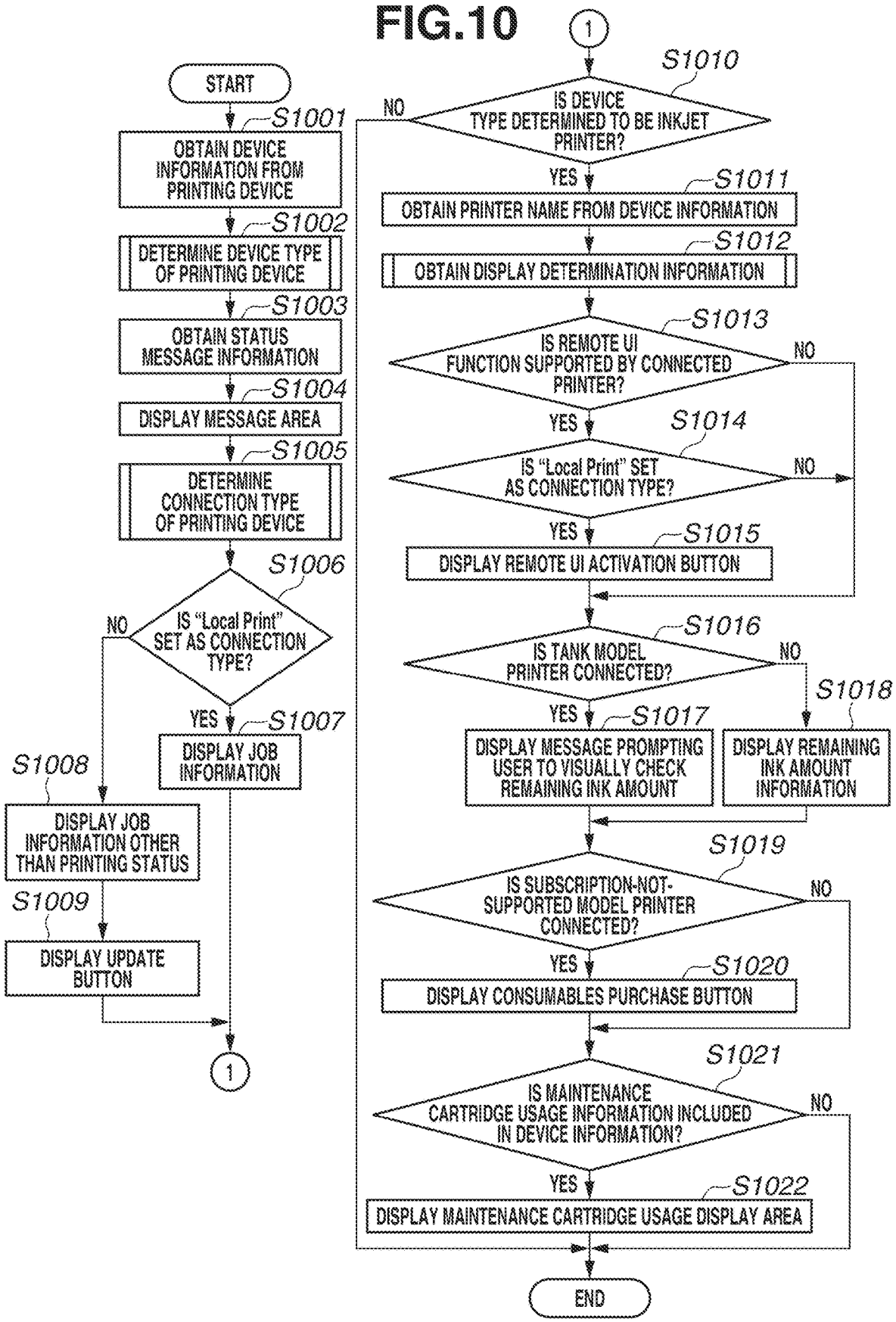

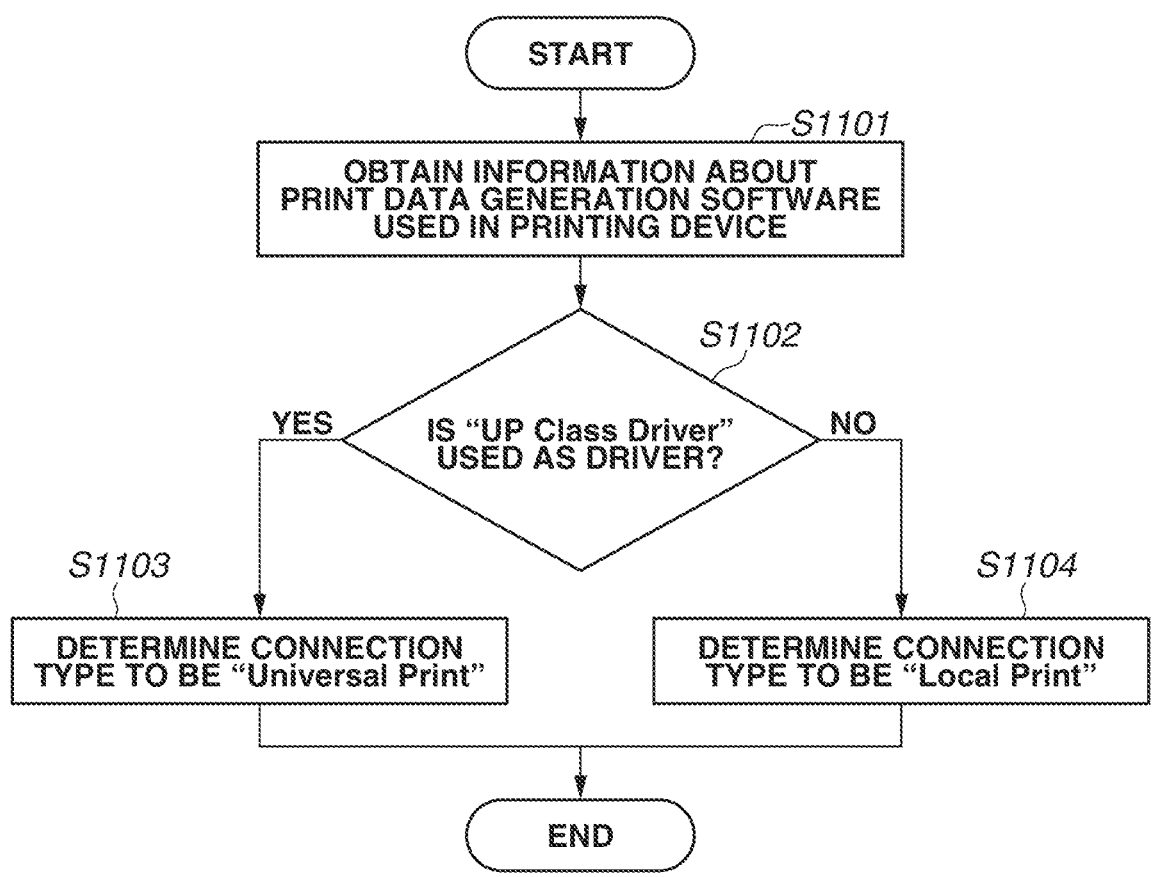

FIG.13

| PRINTER TYPE | PRINTER NAME |
|---|---|
| REMOTE UI-SUPPORTED MODEL | Printer A |
| | Printer B |
| | Printer C |
| TANK MODEL | Printer B |
| | Printer C |
| SUBSCRIPTION-UNSUPPORTED MODEL | Printer A |
| | Printer D |

| INKJET DEVICE | LASER BEAM DEVICE | OTHER |
|---|---|---|
| SHEET TYPE | SHEET SIZE | SHEET TYPE |
| SHEET SIZE | PRINT ORIENTATION | SHEET SIZE |
| PRINT ORIENTATION | SHEET TYPE | PRINT ORIENTATION |
| SHEET TRAY | SHEET TRAY | SHEET TRAY |
| REVERSE-ORDER PRINTING | PRINTING IN WIDER PRINT AREA | |
| BORDERLESS PRINTING | STAPLING | |
| DOUBLE-SIDED PRINTING | PUNCHING | |
| | DOUBLE-SIDED PRINTING | |

FIG.15

| STATUS | INKJET DEVICE | LASE BEAM DEVICE |
|---|---|---|
| PRINTING IN PROGRESS | PRINTER IS CURRENTLY PRINTING. | PRINTER IS CURRENTLY PRINTING. |
| OUT-OF-PAPER ERROR | PRINTER IS OUT OF PAPER. USER NEEDS TO LOAD PAPER. | ANY OF FEEDING UNITS IS OUT OF PAPER. |
| INK EMPTY | PRINTER MAY BE OUT OF INK. | — |
| TONER EMPTY | — | PRINTER MAY BE OUT OF TONER. |
| OTHER ERROR | SOME ERROR HAS OCCURRED. PLEASE CHECK PRINTER STATE. | SOME ERROR HAS OCCURRED. PLEASE CHECK PRINTER STATE. |

1501

STORAGE MEDIUM, INFORMATION PROCESSING METHOD, AND INFORMATION PROCESSING APPARATUS

BACKGROUND

Field

The present disclosure relates to a storage medium, an information processing method, and an information processing apparatus.

Description of the Related Art

There is known a configuration in which a print instruction is issued to a printing device connected to a host computer using a printer driver installed on the host computer as software for controlling the printing device. An operating system (OS) is installed as basic software on the host computer. The printer driver is configured in accordance with specifications defined by the OS. The printer driver is called by the OS and runs on the host computer. A vendor that provides a printing device provides a printer driver conforming to the specifications of an OS, thereby making it possible to provide a unit to issue a print instruction to the printing device using the OS.

Windows® has recently provided a standard class driver (hereinafter also referred to as a "standard driver") that can be shared by printing devices provided by a plurality of vendors. Such a standard driver is included in an OS package and can be easily used by connecting any printing device to a host computer. Accordingly, there is no need to install a model-specific printer driver suitable for the printing device, which is convenient for users. The standard driver is configured such that a print function can designated depending on Print Device Capabilities (hereinafter referred to as "PDC") generated based on information obtained from a connected printing device. This configuration enables a user that uses a standard driver to designate a print function depending on the capabilities of the connected printing device by using only a single standard driver.

The standard driver can be associated with an application for extending functions (hereinafter referred to as an "extension application"). A vendor that provides a printing device can provide such an extension application. The extension application can provide a function (extended function), which cannot be implemented using only the standard driver, by editing PDC generated by the standard driver. Japanese Patent Application Laid-Open No. 2019-74906 discusses a technique for extending functions, such as a stamp function, using an extension application.

The extension application discussed in Japanese Patent Application Laid-Open No. 2019-74906 is configured to edit a spool file. The extension application can implement functions, such as a layout printing function, by editing a spool file. What is needed is an appropriate user interface (UI) that makes the most out of the functions of the extension application for extending the functions of the standard driver.

SUMMARY

According to an aspect of the present disclosure, an information processing method for an information processing apparatus including an application configured to extend a function provided by a print data generation software for generating print data to be printed by a plurality of printing devices includes obtaining information about a printing device connected to the information processing apparatus, and causing a display to display, in a case where the obtained information indicates a certain type printing device, information based on a type of the certain type printing device.

Further features of the present disclosure will become apparent from the following description of exemplary embodiments with reference to the attached drawings.

BRIEF DESCRIPTION OF THE DRAWINGS

FIG. 1 is a block diagram illustrating a hardware configuration of a printing system.

FIGS. 2A and 2B are block diagrams each illustrating a software configuration of the printing system.

FIGS. 5A and 5B are diagrams each illustrating an example of a print setting screen to be displayed by a print setting screen extension unit.

FIG. 6 is a flowchart illustrating a flow of print setting screen display processing to be executed by the print setting screen extension unit.

FIG. 7 is a flowchart illustrating a flow of processing for determining a device type of a printing device.

FIG. 8 illustrates an example of PrintCapabilities (PC) generated by print data generation software.

FIG. 10 is a flowchart illustrating a flow of status notification screen display processing to be executed by the notification unit.

FIG. 11 is a flowchart illustrating a flow of processing for determining a connection type of a printing device.

FIG. 13 is a diagram illustrating an example of display determination information.

FIG. 14 is a diagram illustrating an example of supported function information.

FIG. 15 is a diagram illustrating an example of status message information.

DESCRIPTION OF THE EMBODIMENTS

Figure 3:
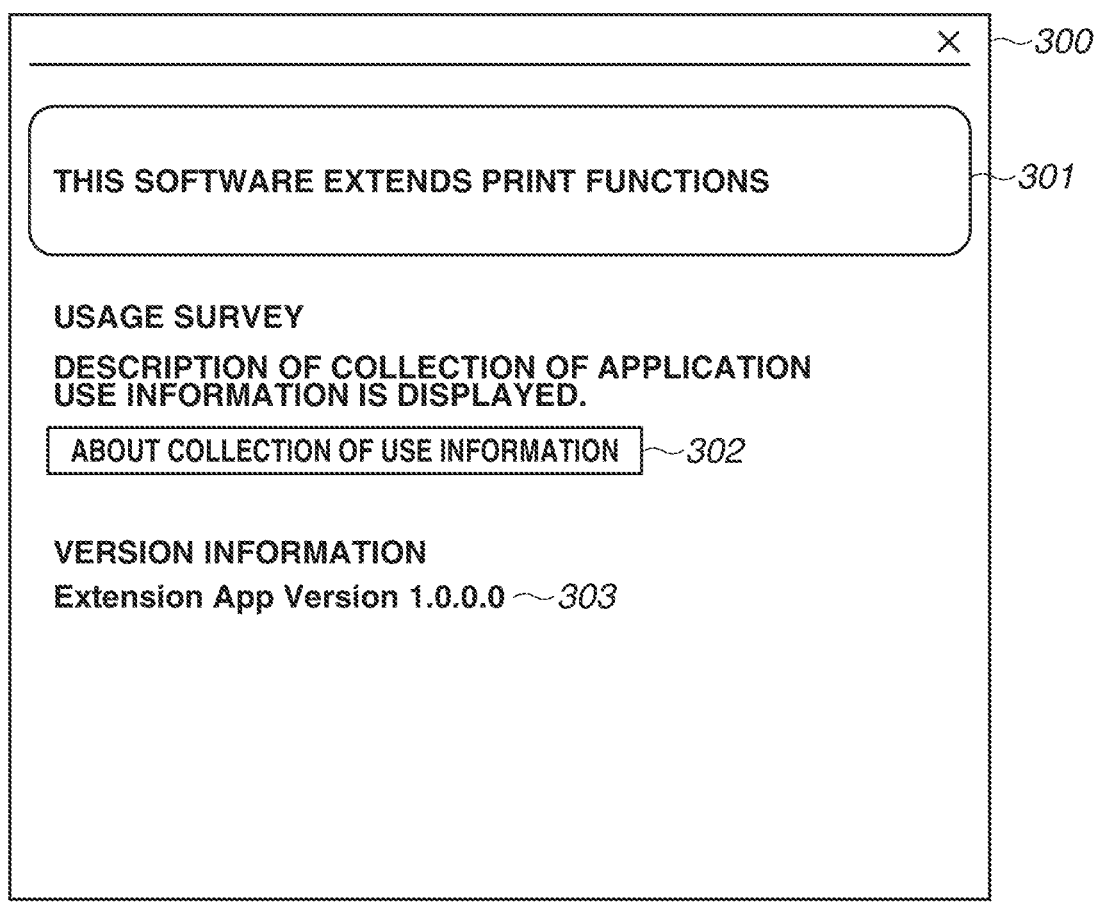
FIG. 3 is a diagram illustrating an example of an independent activation screen to be displayed by an independent activation screen display unit.

Exemplary embodiments of the present disclosure will be described in detail below with reference to the accompanying drawings. The following exemplary embodiments are not intended to limit the scope of the disclosure recited in the claims, and not all combinations of features described in the exemplary embodiments are necessarily essential for means for solving the problem in the present disclosure.

The same components are denoted by the same reference numerals, and redundant descriptions thereof are omitted.

Hardware Configuration of Printing System

FIG. 1 is a block diagram illustrating a hardware configuration of a printing system according to a first exemplary embodiment. As illustrated in FIG. 1, a host computer 101 is an example of an information processing apparatus and includes an input interface 110, a central processing unit (CPU) 111, a read-only memory (ROM) 112, a random access memory (RAM) 113, an external storage device 114, an output interface 115, and an input/output interface 116.

The input interface 110 is connected to input devices such as a keyboard 118 and a pointing device 117. The output interface 115 is connected to a display device such as a display unit 119. A network interface (NET IF) 120 performs control processing to transfer data to an external device via a network.

The ROM 112 stores initialization programs. The external storage device 114 stores an application program group, an operating system (OS), print data generation software, and other various types of data. The RAM 113 is used as a work memory or the like to execute various programs stored in the external storage device 114, so that various programs can run on the host computer 101.

In the present exemplary embodiment of the present disclosure, the CPU 111 performs processing in accordance with procedures of programs stored in the ROM 112, thereby executing processing according to functions to be described below in the host computer 101 and flowcharts to be described below. A printing device 102 is connected to the host computer 101 via the input/output interface 116. In the present exemplary embodiment, the host computer 101 and the printing device 102 are separate from each other, but instead may be configured as one information processing apparatus. In the present exemplary embodiment, a description is given of an example where the printing device 102 is an inkjet printer that performs printing by ejecting ink onto a sheet. However, printing may be executed by any other method (e.g., an electrophotographic method). Examples of the host computer 101 may include a desktop personal computer, a smartphone, and a laptop computer.

Configuration of Printing System Centering on Software

FIGS. 2A and 2B are block diagrams each schematically illustrating a software configuration of the printing system. In the present exemplary embodiment, the description is given assuming that the printing system uses the host computer 101 in which Windows® 11 from Microsoft® is installed as an OS.

FIG. 2A is a diagram illustrating a general configuration example in which an extension application 204 is not associated with the print data generation software 202 and the printing device 102. A rendering application 201 is software for creating content (rendering data) to be printed. Examples of the rendering application 201 include a document creation application and a table calculation application. Upon receiving a print request from a user, the rendering application 201 issues a print instruction to the OS.

The print instruction includes print setting information to instruct the print data generation software 202 and the printing device 102 to operate. The print setting information is also referred to as PrintTicket (hereinafter also referred to as "PT").

The rendering application 201 is configured to display a print setting screen provided by any one of the print data generation software 202, the OS, and the rendering application 201 to output print setting information. The print setting screen includes a setting item (hereinafter also referred to as a "control item") indicating a print function that can be set based on capability information (information that can be set as print settings) obtained from the print data generation software 202, and a control item indicating a setting value for the setting item. The capability information is also referred to as PrintCapabilities (hereinafter also referred to as "PC").

The print data generation software 202 determines PC based on print function information 203. The print function information 203 is data indicating all settable print functions and setting values for the print functions, and data indicating print functions for which an exclusive relationship between setting values are described. The print function information 203 is also referred to as Print Device Capabilities (PDC). The PDC 203 is included in a configuration file of the print data generation software 202, and is arranged in the external storage device 114 as an unchangeable file. Alternatively, the PDC 203 can be dynamically generated by the print data generation software 202. Specifically, the print data generation software 202 or the OS can be configured to obtain attribute data on the printing device 102 from the printing device 102 and generate the PDC 203 based on attribute information in the obtained attribute data. In the case of dynamically generating the PDC 203, the generated PDC 203 can be edited. The attribute data on the printing device 102 that is obtained from the printing device 102 is a response obtained by issuing a Get-Printer-Attributes operation in Internet Print Protocol (IPP) to the printing device 102. The response includes attribute information indicating functions (capabilities of the printing device) that can be designated by the printing device 102, and setting values associated with the attribute information. This response is stored in the RAM 113.

With this configuration, the print data generation software 202 can be configured such that the user can designate print functions that can be used on each printing device 102 depending on the type of the connected printing device 102. In other words, even in a case where printing devices having different functions or printing devices developed by different vendors are connected, the print data generation software 202 can be configured such that the user can designate print functions that can be used depending on the type of the connected printing device.

In the present exemplary embodiment, the description is given of a configuration example in which an IPP Class Driver installed on Windows® 11 is used as the print data generation software 202. The IPP Class Driver is a printer driver that executes print processing based on specification of a standard print protocol called "IPP", and is included in an OS package. The IPP Class Driver is different from a model-specific printer driver depending on the type of the printing device 102. The IPP Class Driver is one of standard class drivers that can be used in common by a plurality of printing devices. The IPP Class Driver obtains capability information about the connected printing device 102 so that the user can designate print functions supported by the connected printing device 102, and generates the PDC 203 based on the information. In the present exemplary embodiment, a printing mode using the IPP Class Driver is also referred to as "Local Print". An UP Class Driver installed on Windows® 11 can also be used as the print data generation software 202. The UP Class Driver is a printer driver to be used for "Universal Print" that is a cloud printing mode for performing printing via a server.

The OS generates intermediate data (also referred to as "input data") based on a print instruction output from the rendering application 201, and delivers the generated intermediate data to the print data generation software 202. Data to be output for printing from the rendering application 201 is data in graphics device interface (GDI) format or data in Extensible Markup Language (XML) Paper Specification (XPS) format. In a case where the IPP Class Driver is used as the print data generation software 202 and the rendering application 201 outputs GDI format data, the OS convers GDI format data output from the rendering application 201 into XPS format data. The converted XPS format data is delivered to the print data generation software 202 as intermediate data. If the rendering application 201 outputs XPS format data, the OS delivers the XPS format data as intermediate data to the print data generation software 202. The intermediate data includes rendering data as information about a picture (image) to be formed on a sheet, and print setting information set by the user.

The print data generation software 202 converts the obtained intermediate data into print data that can be interpreted by the printing device 102, and transmits the print data to the printing device 102. The print data includes rendering data as information about a picture (image) to be formed on a sheet, and print setting attribute information (attribute information for designating print settings) generated based on the print setting information set by the user. The print setting attribute information includes attribute information indicating functions (capabilities of the printing device) that can be designated by the printing device 102, and setting values associated with the attribute information.

The printing device 102 performs printing on a sheet based on print data transmitted from the print data generation software 202. In this case, the printing device 102 forms an image on a sheet based on rendering data included in the print data by performing an operation based on the print setting attribute information included in the print data. The print setting attribute information includes attribute information for designating a printing quality (for example, whether to give priority to image quality or to speed), double-sided printing, and the like, and setting values for the attribute information. For example, if the print setting attribute information includes attribute information for designating double-sided printing and setting values for performing double-sided printing, the printing device 102 executes double-sided printing.

FIG. 2B is a diagram illustrating a configuration example in which the extension application 204 is associated with each of the print data generation software 202 and the printing device 102. Descriptions of components and processing that are similar to those illustrated in FIG. 2A will be omitted.

The extension application 204 is software for extending the function of the print data generation software 202, and is not included in the OS (not included in the OS package). Accordingly, the user needs to operate the host computer 101 to download and install the extension application 204 from the server via the Internet. Alternatively, the extension application 204 may be configured to be automatically installed when the printing device 102 is connected to the host computer 101. Specifically, in a case where the printing device 102 is connected to the host computer 101, the OS obtains device identification information from the printing device 102. The OS may download and install the extension application 204 corresponding to the obtained device identification information from the server via the Internet. In other words, the print data generation software 202 and the extension application 204 are stored as different files in the host computer 101.

There is a case where the print data generation software 202 and the extension application 204 are updated and upgraded. The update processing on the print data generation software 202 and the update processing on the extension application 204 are performed at different timings. In other words, a timing when an updated file of the print data generation software 202 is obtained by the host computer 101 is different from a timing when an updated file of the extension application 204 is obtained by the host computer 101. A trigger based on which the updated file of the print data generation software 202 is obtained by the host computer 101 is also different from a trigger based on which the updated file of the extension application 204 is obtained by the host computer 101. When the extension application 204 is installed, the OS associates the extension application 204 with each of the print data generation software 202 and the printing device 102.

The extension application 204 described in the present exemplary embodiment includes a print setting screen extension unit 205, a skip control unit 206, a print function extension unit 207, a print data edit unit 208, a notification unit 209, and an independent activation screen display unit 211. The extension application 204 stores shared information 210 that can be accessed in common from each unit. Specific examples of the shared information 210 include a file stored in the external storage device 114, and information stored in the RAM 113. The extension application 204 writes and reads information to and from the shared information 210 using an Application Program Interface (API) provided by the OS.

The extension application 204 may terminate an operation every time processing on each unit is completed. In this case, the OS activates the extension application 204 every time the OS receives a request for using each unit. There are also other possible configurations. For example, upon completion of processing on the print setting screen extension unit 205, the OS terminates the operation of the extension application 204. However, the OS may store the extension application 204 in an activated state even after the processing on the skip control unit 206 is completed. Further, the extension application 204 may cancel processing during the processing of each unit. If processing is cancelled, the job being processed on a print queue is deleted by the OS.

Upon receiving a print request from the user, the rendering application 201 issues a print instruction to the OS. Also, in this configuration, the rendering application 201 can display the print setting screen, like in the configuration illustrated in FIG. 2A. In this configuration, the print setting screen provided by the extension application 204 is displayed. Specifically, the print setting screen provided by the print setting screen extension unit 205 included in the extension application 204 is displayed. Whether to display the print setting screen provided by the print setting screen extension unit 205 depends on a user operation. The print setting screen extension unit 205 will be described in detail below with reference to FIG. 4.

When the rendering application 201 receives a print request from the user and issues a print instruction to the OS, the OS activates the skip control unit 206. The skip control unit 206 controls whether to skip the processing of the print data generation software 202. After the skip control processing of the skip control unit 206, the OS generates intermediate data based on the print instruction output from the rendering application 201, and delivers the intermediate data to the print data generation software 202. In this case, if the skip control unit 206 does not pedisrform skip control processing, the print data generation software 202 processes the intermediate data into print data that can be interpreted by the printing device 102, and delivers the print data to the print data edit unit 208. On the other hand, if the processing of the print data generation software 202 is skipped, the intermediate data is delivered to the print data edit unit 208 without being processed by the print data generation software 202. This enables the print data edit unit 208 to process the intermediate data.

The print data edit unit 208 edits the intermediate data delivered from the print data generation software 202, or the print data processed by the print data generation software 202. As the content to be edited, for example, in layout printing, the print data edit unit 208 changes the layout of the intermediate data or the print data based on print setting information about layout printing received from the OS. The print data edit unit 208 can display a graphical user interface (GUI) screen on the display unit 119 and can also provide functions such as a function for displaying the layout result of the intermediate data or the print data as a preview screen. The print data is not transmitted to the printing device 102 in a state where the GUI screen displayed on the display unit 119 by the print data edit unit 208 is open. The print data transmission processing can be performed after the GUI screen is closed.

The print data is edited by the print data edit unit 208, and the edited print data is delivered to the printing device 102. The printing device 102 performs printing on a sheet based on the received print data.

If the processing of the print data generation software 202 is skipped by the skip control unit 206, the print data edit unit 208 may convert the received intermediate data into print data that can be interpreted by the printing device 102. A function provided by the OS may be used to convert the intermediate data into print data.

The extension application 204 includes the print function extension unit 207. The print function extension unit 207 is configured to edit the PDC 203 generated by the print data generation software 202 or the OS. This configuration enables the print function extension unit 207 to, for example, add a function provided by the extension application 204, add a function that is supported by the printing device 102 and is not supported by the print data generation software 202, and add an exclusive relationship between setting values for print functions. The OS activates the print function extension unit 207 when the extension application 204 is first associated with each of the printing device 102 and the print data generation software 202. Alternatively, the OS may activate the print function extension unit 207 at any other timing, for example, when the OS is activated. This configuration enables the print function extension unit 207 to detect an extended function and add the extended function to the PDC 203 in a case where an option device (e.g., a finisher) is subsequently added to the printing device 102 and a function related to printing is extended.

The extension application 204 includes the notification unit 209. The notification unit 209 is configured to display a notification for the user upon occurrence of an error in the printing device 102. For example, if an out-of-paper error occurs in the printing device 102, the print data generation software 202 detects the error and the OS causes the display unit 119 to display a message using a notification function called "toast notification" which is one of the functions of the OS. When the user presses a button for the toast notification, the notification unit 209 of the extension application 204 is called by the OS, and a user interface (UI) screen of the notification unit 209 is displayed. On the UI screen of the notification unit 209, for example, a detailed message about an out-of-paper error, or a message indicating a paper loading method can be displayed. Once the extension application 204 transmits the print data to the printing device 102, for example, a guide screen associated with the print data cannot be displayed during the processing of each unit.

The extension application 204 includes the independent activation screen display unit 211. The extension application 204 operates in cooperation with the print data generation software 202, but instead can operate alone. When the user issues an instruction to activate the extension application 204, the independent activation screen display unit 211 of the extension application 204 is called and a UI screen of the independent activation screen display unit 211 is displayed.

The configuration of the extension application 204 to implement the present exemplary embodiment does not necessarily include all the functions (units) described above, but instead may include only some of the functions, or may include other functions. The extension application 204 is also simply referred to as print software. As described above, the extension application 204 includes at least one of the function (print setting screen extension unit 205) for displaying a setting screen in cooperation with the print data generation software 202, the function (skip control unit 206) for controlling whether to skip the processing of the print data generation software 202, the function (print data edit unit 208) for editing print data to be input to the printing device 102, the function (print function extension unit 207) for extending a function that can be designated by the print data generation software 202, and the function (notification unit 209) for displaying a screen upon occurrence of an error in the printing device 102, and the function (independent activation screen display unit 211) for displaying a UI screen in response to an activation instruction from the user.

Example of Screen Displayed by Independent Activation Screen Display Unit

The UI screen displayed by the independent activation screen display unit 211 will be described with reference to FIG. 3. An independent activation screen 300 illustrated in FIG. 3 is an example of the UI screen to be displayed by the independent activation screen display unit 211 when an instruction to activate the extension application 204 is issued by the user. In the present exemplary embodiment, the independent activation screen 300 includes only the minimum necessary functions, because the extension application 204 is intended to be used to extend the function of the print data generation software 202. A display area 301 is an area where a description of the function of the extension application 204 is displayed. It is assumed that the extension application 204 is automatically installed when the printing device 102 is connected to the host computer 101.

There may be a case where the extension application 204 can be unintentionally installed. Accordingly, the display area 301 is provided to recognize what the extension application 204 will do when the user activates the extension application 204. A control item 302 indicates a license dialog activation button. When the control item 302 is pressed, a dialog for confirming the license for a usage survey is displayed. A common activation screen is displayed when the extension application 204 is activated, regardless of a device type (a laser beam device or an inkjet device) to be described below.

Figure 4:
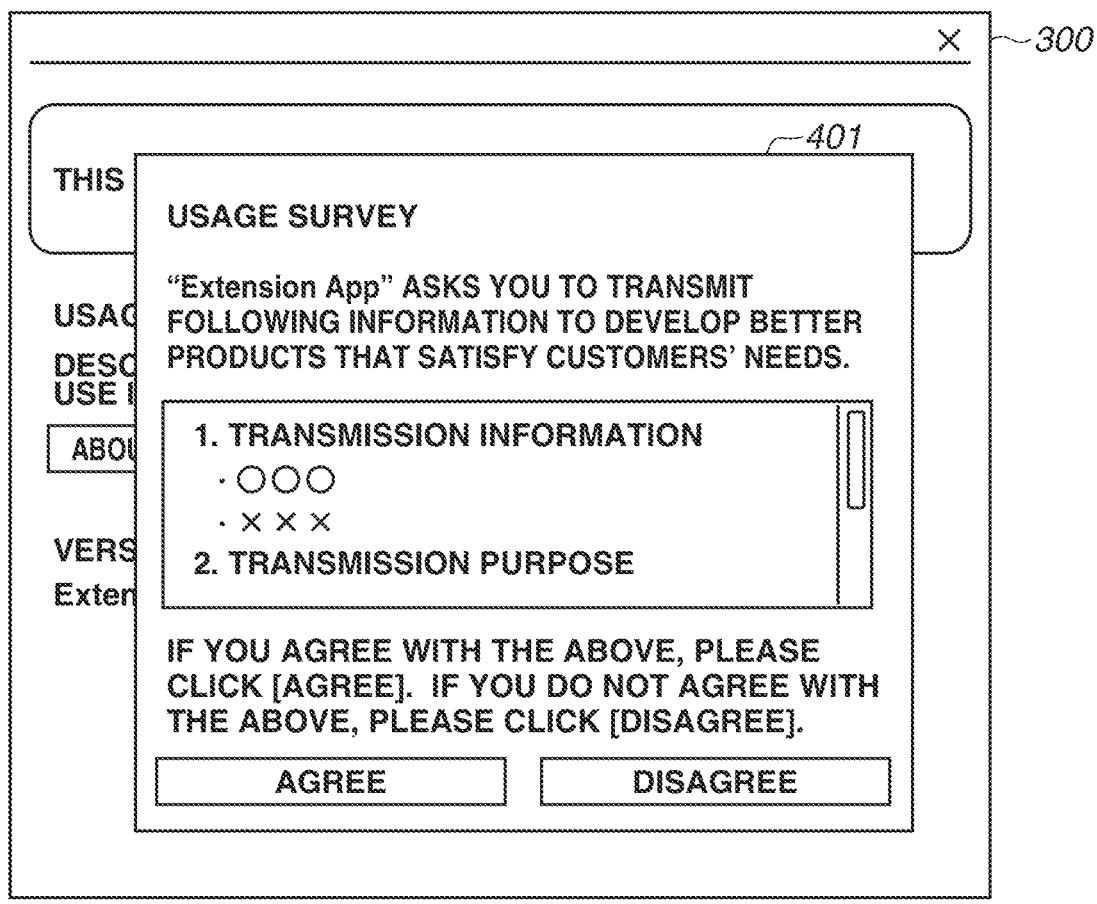
FIG. 4 is a diagram illustrating an example of a license dialog to be displayed on the independent activation screen.

FIG. 4 is a diagram illustrating a state where a license dialog for a usage survey is displayed on the independent activation screen 300. When the control item 302 is pressed, a license dialog 401 is activated.

The user checks a message displayed on the license dialog, and selects whether to agree with the message. If the user selects "agree", the extension application 204 sends information about an operation performed by the user, environmental information about the host computer 101 on which the extension application 204 is installed, and the like to the server, and the information is collected. An application vendor uses the collected information to improve the extension application 204. If the user does not select "agree" on the license dialog, the extension application 204 does not execute the information collection processing. The license dialog 401 may be displayed not only when the control item 302 is pressed, but also when the independent activation screen 300 is first activated. Displaying the license dialog 401 when the independent activation screen 300 is first activated enables the extension application 204 to more reliably confirm whether the user agrees with the message. A display area 303 is an area to display version information about the extension application 204.

Example of Screen Displayed by Print Setting Screen Extension Unit

Next, the print setting screen to be displayed by the print setting screen extension unit 205 will be described with reference to FIGS. 5A and 5B. A print setting screen 500 each illustrated in FIGS. 5A and 5B is an example of the screen to be displayed by the print setting screen extension unit 205 based on the generated PC. The print setting screen extension unit 205 is called by the OS when the user issues an instruction to display the print setting screen on the rendering application 201. The print setting screen extension unit 205 displays the screen on which setting values for print functions that can be designated by the print data generation software 202 can be designated by the user based on the PC that can be obtained from the OS.

The print setting screen 500 illustrated in FIG. 5A is an example of the screen to be displayed by the print setting screen extension unit 205 when an inkjet device is associated as the printing device 102. A control item 501 indicates an independent activation screen activation button. When the control item 501 is pressed, the independent activation screen display unit 211 displays the independent activation screen 300. When the independent activation screen 300 is first displayed, the independent activation screen display unit 211 also displays the license dialog 401 to confirm agreement with the usage survey. If the extension application 204 is automatically installed in response to a connection of the printing device 102 as a trigger, it can be assumed that the user is not aware that the extension application 204 is installed and the user does not activate the independent activation screen 300. Accordingly, the provision of the control item 501 for activating the independent activation screen 300 on the print setting screen 500 contributes to an improvement in the permission rate of the usage survey.

A control item 502 can be used to set the type of a sheet to be used for printing. For example, items such as plain paper and photo paper can be set. A control item 503 can be used to set the size of a sheet to be used for printing. For example, items such as A4-size and letter-size can be set. A control item 504 can be used to set a print orientation. Portrait and landscape can be set on the control item 504. A control item 505 can be used to set a print sheet feeding port of the printing device 102. For example, items such as a main tray and a rear tray can be set. A control item 506 can be used to enable or disable reverse-order printing. A control item 507 can be used to enable or disable borderless printing. A control item 508 can be used to set double-sided printing. For example, long-edge binding and short-edge binding can be set for single-sided printing and double-sided printing. A control item 509 indicates an OK button. When the control item 509 is pressed, the setting contents are reflected and the screen is closed. A control item 510 indicates a cancel button. When the control item 510 is pressed, the screen is closed without reflecting the setting contents.

The print setting screen 500 illustrated in FIG. 5B is an example of the screen to be displayed by the print setting screen extension unit 205 when a laser beam device is associated as the printing device 102. The control items 501 to 505 and 508 to 510 are the same as those illustrated in FIG. 5A, and thus the descriptions thereof are omitted.

A control item 511 can be used to enable or disable borderless printing, which is the same setting as that set by the control item 507. As the function name of the control item 511, however, "printing in wider print area" is described. Even in a case where the same setting is used, how the function is presented to the user on the inkjet device may be different from that on the laser beam device.

Accordingly, on the control items 507 and 511, the function name is changed depending on the device type. A control item 512 can be used to set a stapling position. A control item 513 can be used to set punching. These control items 512 and 513 are not included in the print setting screen 500 illustrated in FIG. 5A.

The print setting screen 500 illustrated in FIG. 5A and the print setting screen 500 illustrated in FIG. 5B have different configurations. Specifically, print settings to be displayed, function names to be displayed, and the layout order of control items to change print settings are different. Settings for the sheet type, the sheet size, the print orientation, sheet trays, and double-sided printing can be made regardless of the device type. Reverse-order printing can be set only when the inkjet device is used. Stapling and punching can be set only when the laser beam device is used.

The print setting control items to be to arranged on the print setting screen 500 are determined based on the PC obtained from the print data generation software 202 and supported function information for each device type determined by a method to be described below. This configuration makes it possible to display a UI screen appropriately customized depending on the device type, instead of displaying the same UI screen on all the connected printing devices 102. On the print setting screen 500 illustrated in FIG. 5A, the control item 502 for setting the sheet type is located at the top of the screen. On the other hand, on the print setting screen 500 illustrated in FIG. 5B, the control item 503 for setting the sheet size is located at the top of the screen. Important functions in the inkjet device are different from important functions in the laser beam device. The inkjet device uses various types of sheets depending on the intended use, and thus the sheet type setting is important. Accordingly, the control item 502 for setting the sheet type is located at the top of the screen that is a conspicuous location for the user. On the other hand, the laser beam device mainly uses plain paper for office use, and thus the sheet type setting is rarely changed. Accordingly, the control item 502 for setting the sheet type is located below the items for setting the sheet size and the print orientation. Thus, in the inkjet device, as illustrated in FIG. 5A, the items for setting the sheet type, the sheet size, and the print orientation are arranged in this order from top. On the other hand, in the laser beam device, as illustrated in FIG. 5B, the items for setting the sheet size, the print orientation, and the sheet type are arranged in this order from top. In such a manner, in the present exemplary embodiment, the layout order of a plurality of print settings may vary depending on the device type.

In device type determination processing to be described below, the printing device may be determined to be a device other than the inkjet device and the laser beam device. In this case, only the minimum required functions that are common to both types of devices can be displayed. Alternatively, if the printing device is determined to be a device other than the inkjet device and the laser beam device, the functions of one of the inkjet device and the laser beam device may be displayed.

Print Setting Screen Display Processing

FIG. 6 is a flowchart illustrating a flow of main processing in print setting screen display processing to be performed by the print setting screen extension unit 205 in the printing system. The print setting screen extension unit 205 may be described below as the subject of each processing. However, in practice, the CPU 111 executes the corresponding program, thereby implementing the corresponding function.

When the extension application 204 receives a print setting screen display instruction from the rendering application 201, the flow of processing illustrated in FIG. 6 is started. In step S601, the print setting screen extension unit 205 obtains PC from the print data generation software 202. FIG. 8 is a diagram illustrating an example of PC 800 generated by the print data generation software 202. The PC 800 includes information about a function (Feature) that can be used by the print data generation software 202, and information about a setting value (Option) in a certain function. The PC 800 illustrated in FIG. 8 indicates that a sheet size (PageMediaSize), a sheet type (PageMediaType), and a print orientation (PageOrientation) can be set. The print setting screen extension unit 205 and an application for providing a unique print setting screen can provide a print setting screen with reference to the PC 800.

In step S602, the print setting screen extension unit 205 obtains device information from the printing device 102. The device information is included in a response obtained by issuing a Get-Printer-Attributes operation in the IPP to the printing device 102. In step S603, the device type of the associated printing device 102 is determined using the information obtained in step S602.

FIG. 7 is a flowchart illustrating a flow of detailed processing of step S603 to be performed by the print setting screen extension unit 205. The flow of processing illustrated in FIG. 7 is based on the premise that the information obtained in step S602 is information obtained in the response that is obtained by issuing the Get-Printer-Attributes operation in the IPP to the printing device 102. Alternatively, in the flow of processing, the device type may be determined using information obtained by any other method. In step S701, the print setting screen extension unit 205 checks whether the marker-types attribute is included in the response obtained by issuing the Get-Printer-Attributes operation in the IPP to the printing device 102. If it is determined that the marker-types attribute is included in the response (YES in step S701), the processing proceeds to step S702. In step S702, the print setting screen extension unit 205 checks whether the marker-types attribute value in the response obtained by issuing the Get-Printer-Attributes operation in the IPP to the printing device 102 indicates "ink-cartridge". If it is determined that the marker-types attribute value indicates "ink-cartridge" (YES in step S702), the processing proceeds to step S703. In step S703, the print setting screen extension unit 205 determines the device type of the printing device 102 to be the inkjet device.

If it is determined that the marker-types attribute is not included in the response (NO in step S701), the processing proceeds to step S705. In step S705, the print setting screen extension unit 205 checks whether the printer-supply attribute is included in the response obtained by issuing the Get-Printer-Attributes operation in the IPP to the printing device 102. If it is determined that the printer-supply attribute is included in the response (YES in step S705), the processing proceeds to step S706. In step S706, the print setting screen extension unit 205 checks whether "type=toner" is included in the printer-supply attribute value in the response obtained by issuing the Get-Printer-Attributes operation in the IPP to the printing device 102. If it is determined that "type=toner" is included in the printer-supply attribute value (YES in step S706), the processing proceeds to step S707. In step S707, the print setting screen extension unit 205 determines the device type of the printing device 102 to be the laser beam device. In any of a case where it is determined that the marker-types attribute value does not indicate "ink-cartridge" (NO in step S702), a case where it is determined that the printer-supply attribute is not included in the response (NO in step S705) and a case where it is determined that "type=toner" is not included in the printer-supply attribute value (NO in step S706), the processing proceeds to step S704. In step S704, the print setting screen extension unit 205 determines the device type of the printing device 102 to be other device type.

In the flow of processing illustrated in FIG. 7, the print setting screen extension unit 205 determines the device type based on the information in the response obtained by issuing the Get-Printer-Attributes operation in the IPP to the printing device 102. However, the device type may be determined based on any information other than the above-described information. For example, the device type may be determined based on information obtained by any other method from the printing device 102. The device type may also be determined based on information such as the name of the printing device 102 obtained from the printing device 102, and table information included in the extension application 204. The table information may be obtained from the server (not illustrated).

Referring again to the flow of processing in FIG. 6, in step S604, the print setting screen extension unit 205 obtains supported function information 1401 depending on the device type. FIG. 14 is a diagram illustrating an example of the supported function information 1401 obtained in step S604. In the supported function information 1401, functions to be displayed on the print setting screen by the print setting screen extension unit 205 and display order information are described for each device type. The supported function information 1401 may be preliminarily stored in the extension application 204, but instead may be obtained from an external server.

The processing of steps S605 and S606 is processing to be repeatedly performed for each function described in the supported function information obtained in step S604 by the print setting screen extension unit 205. For example, if the device type is determined to be the inkjet device in step S603, the processing of steps S605 and S606 is repeatedly executed for each of the sheet type, the sheet size, the print orientation, sheet trays, reverse-order printing, borderless printing, and double-sided printing. In step S605, the print setting screen extension unit 205 checks whether supported functions are included in the PC. The PC is generated based on PDC generated by obtaining capability information from the printing device 102 by the IPP Class Driver. In other words, the functions described in the PC are functions that can be set by the IPP Class Driver. The print setting screen extension unit 205 checks the functions to be displayed based on the supported function information 1401, and checks whether the connected printing device 102 supports the functions based on the PC.

If it is determined that the supported functions are included in the PC (YES in step S605), the processing proceeds to step S606. In step S606, the print setting screen extension unit 205 adds control items for setting the functions on the print setting screen 500. If it is determined that the supported functions are not included in the PC (NO in step S605), the print setting screen extension unit 205 determines that the printing device 102 does not support the functions, and does not add the control items for setting the functions on the print setting screen 500. The processing of steps S605 and S606 is repeatedly performed a number of times corresponding to the number of target functions, and the print setting screen extension unit 205 displays the print setting screen 500 depending on the capabilities and device type of the connected printing device 102.

The functions that are not included in the supported function information 1401 are functions that need not be set by the user, or functions that are not recognized at the time of the development of the extension application 204. The functions that need not be set by the user are not displayed on the print setting screen 500, thereby simplifying the setting screen so that the user can easily focus on important print settings. Accordingly, even when information indicating the functions is included in the PC, the information is not displayed on the print setting screen 500. The effect of making settings for the functions that are not recognized at the time of the development of the extension application 204 is unknown. Accordingly, even when information indicating the functions is included in the PC, the functions are not displayed on the print setting screen 500 so as to prevent the user from making settings for the functions.

Example of Screen Displayed by Notification Unit

Figure 9A:
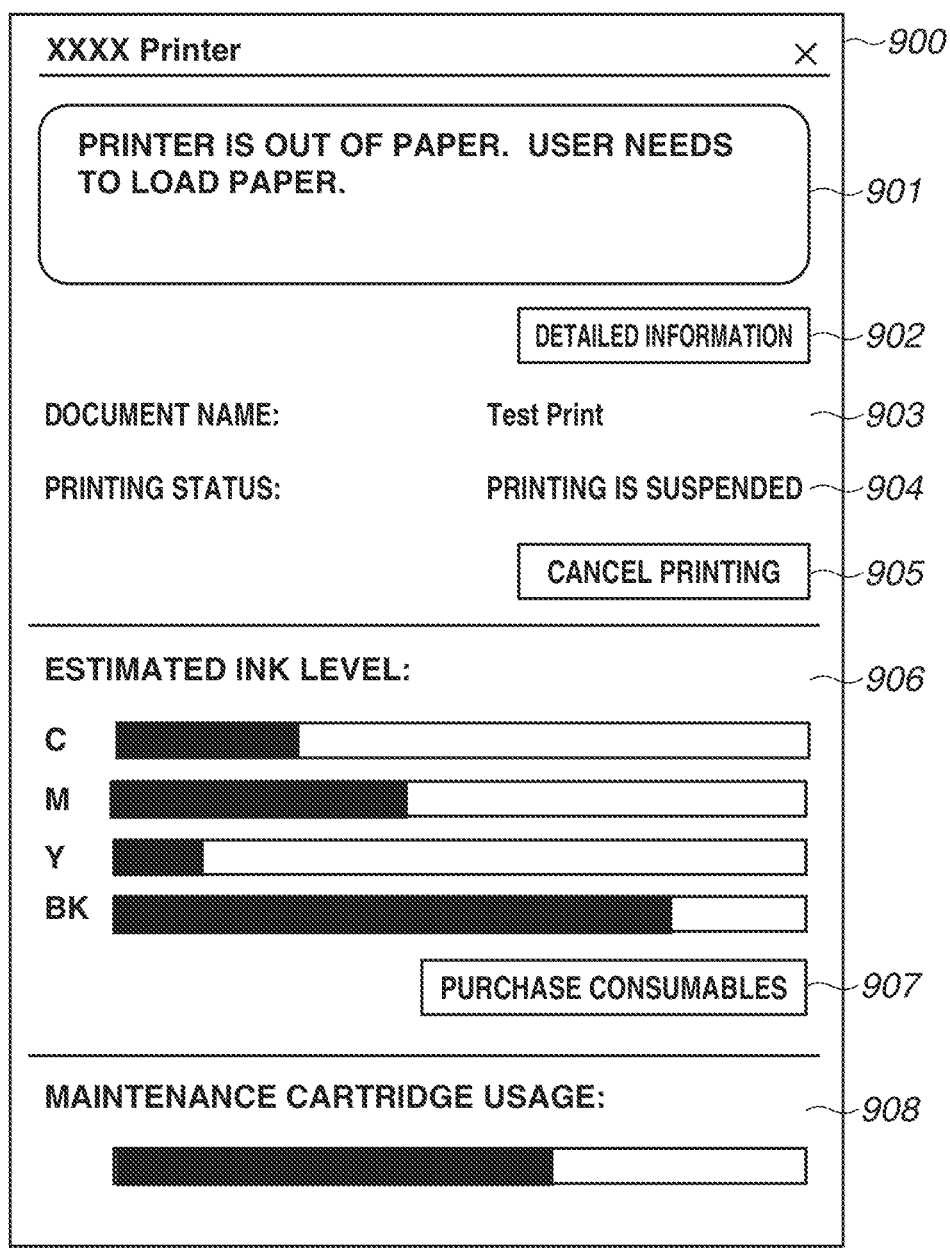
FIGS. 9A and 9B are diagrams each illustrating an example of a status notification screen to be displayed by a notification unit.
Figure 9B:
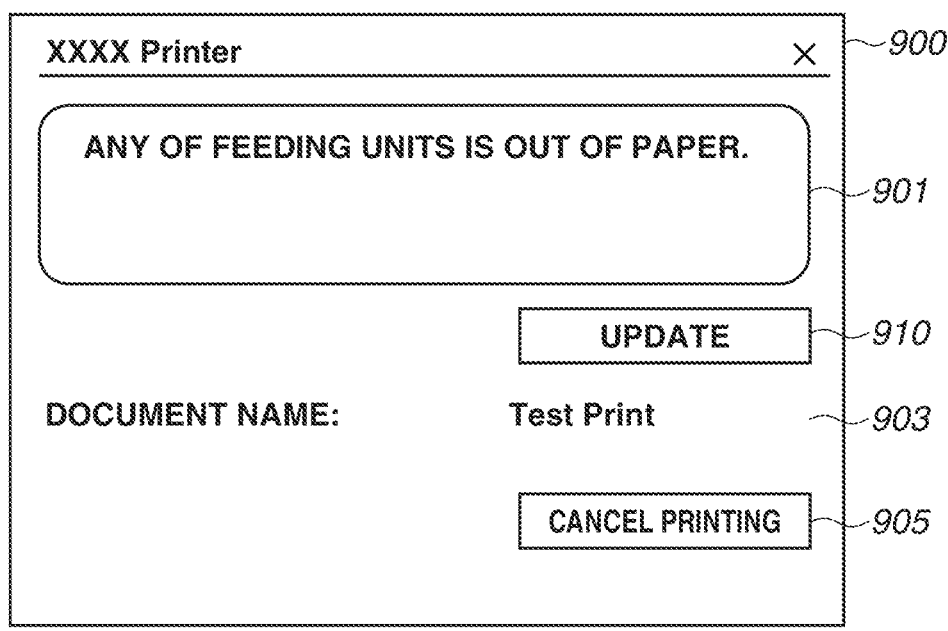

Next, the print setting screen to be displayed by the notification unit 209 will be described with reference to FIGS. 9A and 9B. A status notification screen 900 each illustrated in FIGS. 9A and 9B is an example of the screen to be displayed by the notification unit 209 based on information obtained from the printing device 102. The notification unit 209 is called by the OS when the user presses the button for the toast notification displayed by the OS based on an error state in the printing device 102 as a trigger.

The status notification screen 900 illustrated in FIG. 9A is an example of the screen to be displayed by the notification unit 209 when an inkjet device is associated as the printing device 102. A display area 901 is a display area to display a message corresponding to the device information obtained from the printing device 102. FIGS. 9A and 9B each illustrate a state where a message to be displayed when the printing device 102 is in an out-of-paper error state is displayed on the display area 901. A control item 902 indicates a remote UI activation button. When the control item 902 is pressed, a remote UI provided by the associated printing device 102 is displayed. The remote UI can be displayed by activating a browser, but instead may be displayed within the status notification screen 900. This configuration enables the user to browse and manage the device information about the printing device 102, consumables information, and the like via the remote UI.

Information about the print job is displayed on display areas 903 and 904. The OS displays the toast notification when an error or the like occurs in the printing device 102 during the print job processing being executed by the print data generation software 202. The toast notification used as a trigger to activate the status notification screen 900 is associated with a specific print job. The notification unit 209 displays information about the print job associated with the toast notification based on which the status notification screen 900 is activated, and issues a print cancel instruction.

The document name of the print job is displayed on the display area 903. The state of the print job is displayed on the display area 904. Examples of state information indicating the state of the print job to be displayed on the display area 904 include "printing is suspended" displayed when the printing device 102 is in an error state, and "printing in progress" displayed when the error is resolved and printing is resumed. A control item 905 indicates a print job cancel button. When the control item 905 is pressed, the print job is cancelled to cancel printing. A display area 906 is a display area to display remaining ink amounts. The notification unit 209 obtains device information from the printing device 102, and displays the remaining ink amounts in a bar format based on remaining ink amount information included in the device information. A control item 907 indicates a consumables purchase button. When the control item 907 is pressed, a site to purchase consumables such as ink is displayed. The consumables purchase site can be displayed by activating a browser, or can be displayed within the status notification screen 900. A display area 908 is an area to display the usage of a maintenance cartridge. The notification unit 209 obtains device information from the printing device 102, and displays the remaining ink amounts based on maintenance cartridge capacity information included in the device information.

The status notification screen 900 illustrated in FIG. 9B is an example of the screen to be displayed by the notification unit 209 when a laser beam device is associated as the printing device 102. The status notification screen 900 illustrated in FIG. 9B is described assuming that the UP Class Driver is used as the print data generation software 202. The display areas 901 and 903 and the control item 905 are the same as those illustrated in FIG. 9A, and thus the descriptions thereof are omitted. A control item 910 indicates an update button. When the control item 910 is pressed, device information and job information are obtained again from the printing device 102, and the display is updated based on the obtained information.

In a case where the update button is not displayed, the notification unit 209 obtains information and updates the display at predetermined intervals. The update button can be used to manually update the display in cloud printing in which the amount of data communication due to polling is to be reduced, because an increase in the amount of data communication leads to an increase in cost.

Thus, the notification unit 209 can provide the user with a status notification suitable for the connected printing device 102 not only by providing a status notification based on the device information obtained from the printing device 102, but also by changing the screen configuration depending on the device type or the print data generation software 202 that is in use.

Display Processing Performed by Notification Unit

FIG. 10 is a flowchart illustrating a flow of main processing in status notification screen display processing to be performed by the notification unit 209 in the printing system. The notification unit 209 may be described below as the subject of each processing. However, in practice, the CPU 111 executes the corresponding program, thereby implementing the corresponding function.

When the extension application 204 receives a status notification screen display instruction from the OS via the toast notification, the flow of processing illustrated in FIG. 10 is started. In step S1001, the notification unit 209 obtains device information from the printing device 102. The device information is included in the response obtained by issuing the Get-Printer-Attributes operation in the IPP to the printing device 102. In step S1002, the notification unit 209 determines the device type of the associated printing device 102 using the information obtained in step S1001.

The processing of step S1002 is similar to that illustrated in FIG. 7, and thus the description thereof is omitted. The notification unit 209 performs the processing of step S1002. If the print setting screen extension unit 205 has made a determination of the device type in advance, the information may be preliminarily stored in the shared information 210 and may be obtained, in which case the processing illustrated in FIG. 7 can be skipped. In step S1003, the notification unit 209 obtains status message information. The status message information can be preliminarily stored in the extension application 204, but instead may be obtained from an external server. FIG. 15 is a diagram illustrating an example of the status message information. In status message information 1501, information about a message to be displayed when the printing device 102 associated with the status is an inkjet device and a message to be displayed when the printing device 102 associated with the status is a laser beam device is described. For example, if the status information obtained from the printing device 102 indicates "printing in progress", the notification unit 209 displays the same message, regardless of the device type.

On the other hand, if the status information obtained from the printing device 102 indicates an out-of-paper error, a message that varies depending on the device type is displayed. For example, in the case of the inkjet device, a message "The printer is output of paper. The user needs to load paper." is displayed. On the other hand, in the case of the laser beam device, a message "Any of feeding units is out of paper." is displayed because many of laser beam devices include a plurality of feeding units. If the status information indicates "ink empty", only the inkjet device displays the message corresponding to the status. If the status information indicates "toner empty", only the laser beam device displays the message corresponding to the status. Not only "ink empty" (out of ink) and "toner empty" (out of toner), a message indicating "ink low", "toner low", or the like may be displayed when the remaining amount is small. In this manner, the message to be displayed by the notification unit 209 varies depending on the type of the device connected as the printing device 102. In step S1004, the notification unit 209 displays an appropriate message based on the device type determined in step S1002 and the status message information 1501 obtained in step S1003. In the present exemplary embodiment, the notification unit 209 changes the message depending on the device type. The message to be display may be changed depending on another information. For example, the notification unit 209 may determine a connection type of the printing device 102, and may change the message depending on whether the connection type is "Local Print" or "Universal Print".

In step S1005, the notification unit 209 determines the connection type of the associated printing device 102. FIG. 11 is a flowchart illustrating a flow of detailed processing of step S1005 to be performed by the notification unit 209. In step S1101, the notification unit 209 obtains information about the print data generation software 202 used in the associated printing device 102. The print data generation software 202 that can be extended by the extension application 204 includes two types of drivers, i.e., IPP Class Driver and UP Class Driver. In other words, the printing device 102 associated with the extension application 204 uses one of the IPP Class Driver and the UP Class Driver. Accordingly, in step S1102, the notification unit 209 checks whether the UP Class Driver is used as the driver. If it is determined that the UP Class Driver is used as the drier (YES in step S1102), the processing proceeds to step S1103. In step S1103, the notification unit 209 determines the connection type of the printing device 102 to be "Universal Print". If it is determined that UP Class Driver is not used as the driver (NO in step S1102), the processing proceeds to step S1104. In step S1104, the notification unit 209 determines the connection type of the printing device 102 to be "Local Print".

Referring again to the processing flow of FIG. 10, in step S1006, the notification unit 209 checks whether the connection type is "Local Print". If it is determined that the connection type is "Local Print" (YES in step S1006), the processing proceeds to step S1007. In step S1007, the notification unit 209 displays the display areas 903 and 904 indicating print job information and the control item (print job cancel button) 905 on the status notification screen 900.

Steps S1008 and S1009 are processing to be executed when it is determined that the connection type is "Universal Print". If it is determined that the connection type is not "Local Print" (NO in step S1006), the processing proceeds to step S1008. In step S1008, the notification unit 209 displays the display area 903 indicating print job information and the control item 905 for issuing the print job cancel instruction on the status notification screen 900, and does not display the display area 904 indicating print job status information on the status notification screen 900. In "Universal Print", the display area 904 is not displayed. This is because, if state information is obtained via the server, the state information cannot be accurately synchronized with the state of the printing device 102. Next, in step S1009, the notification unit 209 displays the control item 910 for issuing a display update instruction on the status notification screen 900.

In the present exemplary embodiment, a remote UI activation button (control item 902), a remaining ink amount display area (display area 906), an ink purchase button (control item 907), and a maintenance cartridge usage display area (display area 908) are displayed only when the inkjet device is used. Accordingly, in step S1010, the notification unit 209 checks whether the device type determined in step S1002 is an inkjet printer. If it is determined that the device type is an inkjet printer (YES in step S1010), the processing of steps S1011 to S1022 is executed and the remote UI activation button, the remaining ink amount area, the ink purchase button, and the maintenance cartridge usage display area are displayed.

First, in step S1011, the notification unit 209 obtains information about the printer name from the device information obtained in step S1001. Next, in step S1012, the notification unit 209 obtains display determination information. FIG. 13 is a diagram illustrating an example of display determination information 1301. In the display determination information 1301 illustrated in FIG. 13, information indicating whether the remote UI is supported, information indicating whether the device type is a tank model, and information indicating whether the connected printing device 102 is a subscription-not-supported model are described in a manner associated with printer information. The notification unit 209 determines the content to be displayed on the status notification screen 900 based on the display determination information 1301 and the printer name of the connected printing device 102.

Figure 12:
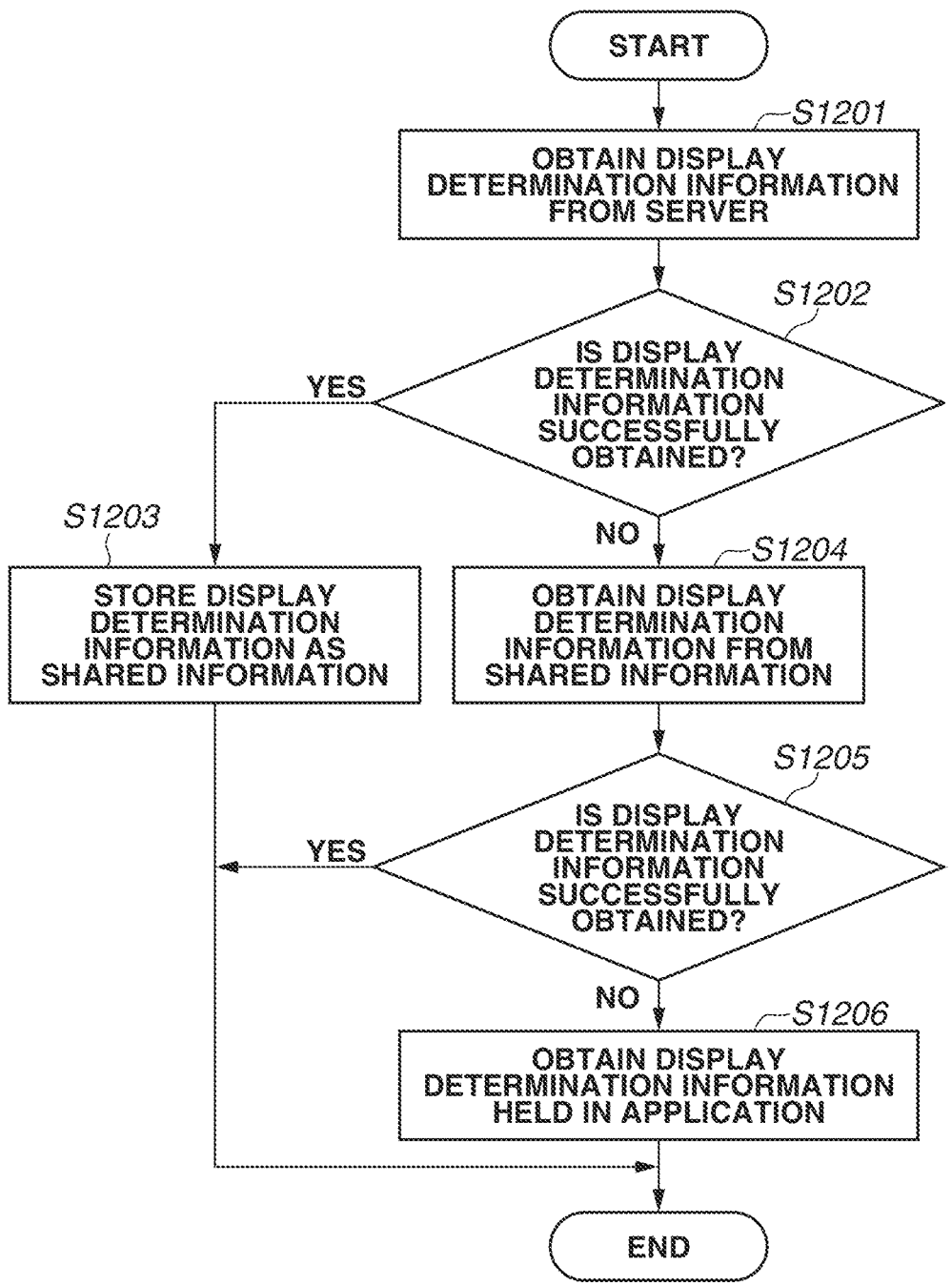
FIG. 12 is a flowchart illustrating a flow of processing for obtaining display determination information.

FIG. 12 is a flowchart illustrating a flow of detailed processing of step S1012 to be performed by the notification unit 209. In step S1201, the notification unit 209 obtains the display determination information 1301 from the server. The configuration in which the display determination information 1301 is obtained from the server enables the notification unit 209 to obtain the latest information without the need for updating and releasing the extension application 204. In step S1202, the notification unit 209 checks whether the display determination information 1301 is successfully obtained in step S1201.

If it is determined that the display determination information 1301 is successfully obtained (YES in step S1202), the notification unit 209 uses the display determination information 1301 obtained in step S1201 for the processing of step S1013 and subsequent steps in FIG. 10. In step S1203, the notification unit 209 stores the display determination information 1301 in the shared information 210. This enables the notification unit 209 to use the latent information within the range in which the information can be obtained, even when the display determination information 1301 cannot be obtained from the server in the next and subsequent activation processing. If it is determined that the display determination information 1301 is not successfully obtained (NO in step S1202), the processing proceeds to step S1204. In step S1204, the notification unit 209 obtains the display determination information 1301 from the shared information 210. In step S1205, the notification unit 209 checks whether the display determination information 1301 is successfully obtained in step S1204. If it is determined that the display determination information 1301 is successfully obtained (YES in step S1205), the notification unit 209 uses the display determination information 1301 obtained in step S1204 for the processing of step S1013 and subsequent steps in FIG. 10. If it is determined that the display determination information 1301 is not successfully obtained (NO in step S1205), the notification unit 209 obtains the display determination information 1301 preliminarily stored in the extension application 204 in step S1206, and uses the display determination information 1301 for the processing of step S1013 and subsequent steps in FIG. 10.

Referring again to the processing flow of FIG. 10, steps S1013 to S1015 are processing for displaying the control item 902 indicating the remote UI activation button on the status notification screen 900.

In step S1013, the notification unit 209 checks whether the connected printing device 102 supports the remote UI function based on the printer name and the display determination information 1301. If the connected printing device 102 supports the remote UI function (YES in step S1013), the processing proceeds to step S1014. In step S1014, the notification unit 209 checks whether the connection type is "Local Print" based on the information determined in step S1005. In the case of "Universal Print", the printing device 102 is connected via the server, and thus the remote UI cannot be displayed. If it is determined that the connection type is "Local Print" (YES in step S1014), the processing proceeds to step S1015. In step S1015, the notification unit 209 displays the control item 902 indicating the remote UI activation button on the status notification screen 900. In any of a case where the connected printing device 102 does not support the remote UI function (NO in step S1013) and a case where the connection type is not "Local Print" (NO in step S1014), the control item 902 indicating the remote UI activation button is not displayed on the status notification screen 900.

Steps S1016 to S1018 are processing for changing the display content of the remaining ink amount display area. In step S1016, the notification unit 209 checks whether the connected printing device 102 is a tank model based on the printer name and the display determination information 1301. The tank model is a model in which the user injects ink into a tank included in the printing device 102 to use the printing device 102. Accordingly, the actual remaining ink amount may be different from the remaining ink amount information recognized by the printing device 102. For this reason, in the tank model, a guide message to prompt the user to visually check the remaining ink amount is displayed, instead of displaying the remaining amount based on the remaining ink amount information obtained from the printing device 102. If it is determined that the connected printing device 102 is a tank model (YES in step S1016), the processing proceeds to step S1017. In step S1017, the notification unit 209 displays a guide message to prompt the user to visually check the remaining ink amount on the display area 906 for displaying the remaining ink amount display. If it is determined that the connected printing device 102 is not a tank model (NO in step S1016), the processing proceeds to step S1018. In step S1018, the notification unit 209 displays the remaining ink amount information on the display area 906 based on the device information obtained in step S1001. Thus, in a cartridge type in which an ink cartridge is attached to the carriage of the printing device 102, the remaining ink amount is displayed, unlike in the tank model. The printing device 102 of a carriage type may be a recording head device of a disposal type in which an ink tank and a recording head are integrated, or a printing device including a recording head of a permanent type in which an ink tank and the recording head are separated from each other.

Steps S1019 and S1020 are processing for displaying the consumables purchase button (control item) 907 on the status notification screen 900. In step S1019, the notification unit 209 checks whether the connected printing device 102 is the subscription-not-supported model based on the printer name and the display determination information 1301. In a subscription-supported printing device, ink is supplied by a printer vendor based on a contract. Accordingly, there is no need for the user to purchase ink, which eliminates the need for the consumables purchase button 907. If it is determined that the connected printing device 102 is the subscription-not-supported model (YES in step S1019), the processing proceeds to step S1020. In step S1020, the notification unit 209 displays the control item 907 indicating the consumables purchase button on the status notification screen 900. If it is determined that the connected printing device 102 is not the subscription-not-supported model (NO in step S1019), the processing proceeds to step S1021, instead of proceeding to step S1020 in which the notification unit 209 displays the control item 907 indicating the consumables purchase button on the status notification screen 900. Even when it is determined that the connected printing device 102 is the subscription-supported model in step S1019, the notification unit 209 further determines whether a predetermined contract of subscription has been made. If the contract has not been made, the control item 907 indicating the consumables purchase button may be displayed.

Steps S1021 and S1022 are processing for displaying the display area 908 to display the usage of the maintenance cartridge on the status notification screen 900. In step S1021, the notification unit 209 checks whether the device information obtained in step S1001 includes the maintenance cartridge usage information. If the printing device 102 does not support the replacement of the maintenance cartridge, the device information does not include the maintenance cartridge usage information, and thus the usage of the maintenance cartridge is not displayed. If it is determined that the device information includes the maintenance cartridge usage information (YES in step S1021), the processing proceeds to step S1022. In step S1022, the notification unit 209 displays the display area 908 indicating the usage of the maintenance cartridge. If it is determined that the device information does not include the maintenance cartridge usage information (NO in step S1021), the notification unit 209 does not display the display area 908.

If it is determined that the device type is not an inkjet printer (NO in step S1010), the processing of steps S1011 to S1022 is skipped, and the remote UI activation button (control item 902), the remaining ink amount display area (display area 906), and the ink purchase button (control item 907) are not displayed. The above-described processing makes it possible to configure the appropriate status notification screen 900 depending on the device type, the connection type, and the capabilities of the connected printing device 102.

A laser beam device is generally used in a shared manner, and an error is referenced on the main body of the laser beam device. Accordingly, it may be sufficient for the status notification screen 900 to display only the minimum information to notice an error state. Some inkjet devices do not include a display panel in the main body, and information to be notified on the main body of the printing device is limited. Accordingly, it is important to display information on the host computer 101.

As described above, according to the present exemplary embodiment, the use of a single extension application 204 makes it possible to display an appropriate UI screen depending on the connected printing device 102. More specifically, the extension application 204 according to the present exemplary embodiment varies the print setting screen and the status notification screen depending on the type of the printing device 102. Consequently, according to the present exemplary embodiment, an appropriate UI screen can be displayed depending on the type of the printing device 102.

In the present exemplary embodiment, when the type of the printing device 102 is an inkjet device, the method of displaying the remaining ink amount is varied depending on whether the device type is a tank type (first type) or a carriage type (second type). Specifically, when the device type is a tank type, the remaining ink amount is not displayed. When the device type is not a tank type, i.e., when the device type is a carriage type, the remaining ink amount is displayed. However, in the present exemplary embodiment, when the device type is a tank type, a message is displayed instead of displaying the remaining ink amount. Further, in the present exemplary embodiment, when the printing device 102 does not support subscription as a predetermined service, an item (consumables purchase button) for connecting to a consumables purchase site is displayed. In this manner, in the present exemplary embodiment, when the printing device 102 is an inkjet device (inkjet printing device), an appropriate UI screen can be displayed depending on the type of the inkjet printing device.

In the present exemplary embodiment, the display of the UI screen varies depending on whether the connection type is "Universal Print" or "Local Print". Specifically, display and non-display of an item (remote UI activation button) for activating the remote UI are switched depending on whether the printing mode is a printing mode (first printing mode) using the IPP Class Driver or a printing mode (second printing mode) using the UP Class Driver. Consequently, in the present exemplary embodiment, an appropriate UI screen can be displayed depending on the printing mode.

While the above-described exemplary embodiment is described based on an example where an inkjet device is set as a first type and a laser beam device is set as a second type, the present exemplary embodiment is not limited to this combination. For example, the second type is not limited to a laser beam device, but can be widely applied to electrophotographic devices such as a light-emitting diode (LED) printer device.

A second exemplary embodiment is described. An object of the present disclosure can be achieved by supplying a recording medium storing a program code as software for implementing functions according to the above-described exemplary embodiment to a system or an apparatus, and causing a computer (or a CPU or a micro processing unit (MPU)) in the system or the apparatus to read out and execute the program code stored in the recording medium. In this case, the program code read out from the storage medium implements the functions according to the above-described exemplary embodiment, and the storage medium storing the program code constitutes the present disclosure.

Examples of the storage medium for supplying the program code include a flexible disk, a hard disk, an optical disk, a magneto-optical disk, a compact disc ROM (CD-ROM), a CD Recordable (CD-R), a magnetic tape, a non-volatile memory card, a ROM, and a digital versatile disc (DVD).

The functions according to the above-described exemplary embodiment can be implemented by executing the program code read out by the computer, and the functions according to the above-described exemplary embodiment can also be implemented by processing in which an OS or the like running on the computer performs a part or all of the actual processing based on an instruction from the program code.

Furthermore, the functions according to the above-described exemplary embodiment can be implemented by processing in which the program code read out from the storage medium is written into a memory included in a function extension board inserted in the computer or a memory included in a function extension unit connected to the computer, and then a CPU or the like included in the function extension board or the function extension unit performs a part or all of the actual processing based on an instruction from the program code.

Other Exemplary Embodiments

The present disclosure includes the following configurations, methods, and non-transitory computer readable storage media.

Configuration 1

An information processing apparatus including an application configured to extend a function provided by print data generation software usable in common for a plurality of different printing devices, the information processing apparatus comprising:
    an obtaining unit configured to obtain information about
        a printing device connected to the information processing apparatus; and
    a display unit configured to display, in a case where the
        information obtained by the obtaining unit indicates a
        first type printing device, a screen with a configuration
        depending on a type of the first type printing device.

Configuration 2

The information processing apparatus according to configuration 1, wherein the first type printing device is an inkjet printing device.

Configuration 3

The information processing apparatus according to configuration 2, wherein the display unit displays a remaining ink amount on the screen in a case where the type of the first type printing device is a carriage type.

Configuration 4

The information processing apparatus according to configuration 3, wherein the display unit displays the remaining ink amount in a bar format on the screen.

Configuration 5

The information processing apparatus according to any one of configurations 2 to 4, wherein the display unit does not display the remaining ink amount on the screen in a case where the type of the first type printing device is a tank type.

Configuration 6

The information processing apparatus according to any one of configurations 1 to 5, wherein the display unit displays an item for connecting to a site to purchase ink on the screen in a case where the first type printing device does not support subscription.

Configuration 7

The information processing apparatus according to any one of configurations 1 to 6, wherein the display unit does not display the item for connecting to the site to purchase ink on the screen in a case where the first type printing device supports subscription.

Configuration 8

The information processing apparatus according to any one of configurations 1 to 7, wherein in a case where the information obtained by the obtaining unit indicates a second type printing device different from the first type printing device, the display unit displays respective screens with different configurations on the first type printing device and the second type printing device.

Configuration 9

The information processing apparatus according to configuration 8, wherein the second type printing device is a laser beam printing device.

Configuration 10

The information processing apparatus according to any one of configurations 1 to 9, wherein the screen is a status notification screen to provide a notification about a status of the printing device.

Method 1

An information processing method for an information processing apparatus including an application configured to extend a function provided by print data generation software usable in common for a plurality of different printing devices, the information processing method comprising the steps of:
obtaining information about a printing device connected to the information processing apparatus; and
displaying, in a case where the information obtained in the obtaining step indicates a first type printing device, a screen with a configuration depending on a type of the first type printing device.

Method 2

The information processing method according to method 1, wherein the first type printing device is an inkjet printing device.

Method 3

The information processing method according to method 2, wherein in the displaying step, a remaining ink amount is displayed on the screen in a case where the type of the first type printing device is a carriage type.

Method 4

The information processing method according to method 3, wherein in the displaying step, the remaining ink amount is displayed in a bar format on the screen.

Method 5

The information processing method according to any one of methods 2 to 4, wherein in the displaying step, the remaining ink amount is not displayed on the screen in a case where the type of the first type printing device is a tank type.

Method 6

The information processing method according to any one of methods 1 to 5, wherein in the displaying step, an item for connecting to a site to purchase ink is displayed on the screen in a case where the first type printing device does not support subscription.

Method 7

The information processing method according to any one of methods 1 to 6, wherein in the displaying step, the item for connecting to the site to purchase ink is not displayed on the screen in a case where the first type printing device supports subscription.

Method 8

The information processing method according to any one of methods 1 to 7, wherein in the displaying step, in a case where the information obtained in the obtaining step indicates a second type printing device different from the first type printing device, respective screens with different configurations are displayed on the first type printing device and the second type printing device.

Method 9

The information processing method according to method 8, wherein the second type printing device is a laser beam printing device.

Method 10

The information processing method according to any one of methods 1 to 9, wherein the screen is a status notification screen to provide a notification about a status of the printing device.

Program 1

A non-transitory computer readable storage medium for storing a computer program for causing a computer to function as each unit of the information processing apparatus according to any one of configurations 1 to 10.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-121180, filed Jul. 29, 2022, which is hereby incorporated by reference herein in its entirety.

What is claimed is:

1. A non-transitory computer-readable storage medium storing an application program for causing a computer of an information processing apparatus to cause the information processing apparatus to execute a method, the method comprising:
cooperating with print data generation software for generating print data to be printed by a plurality of printing devices of a plurality of vendors;
receiving first information about a printing device which is able to communicate with the information processing apparatus;
receiving second information indicating a remaining ink amount of the printing device; and
causing a display to display, in a case where the received first information indicates a first type of an inkjet printing device, the remaining ink amount indicated by the received second information without causing the display to display the remaining ink amount in a case where the received first information indicates a second type of the inkjet printing device.

2. The non-transitory computer-readable storage medium according to claim 1, wherein the first type of the inkjet printing device is a carriage type.

3. The non-transitory computer-readable storage medium according to claim 2, wherein the display is caused to display the remaining ink amount in a bar format.

4. The non-transitory computer-readable storage medium according to claim 1, wherein the type of the second type inkjet printing device is a tank type.

5. The non-transitory computer-readable storage medium according to claim 1, wherein the first information is received according to a Get-Printer-Attributes operation of Internet Printing Protocol.

6. The non-transitory computer-readable storage medium according to claim 1, wherein the first information is a name of the printing device.

7. The non-transitory computer-readable storage medium according to claim 1, wherein the remaining ink amount is displayed on a status notification screen that provides a notification about a status of the printing device.

8. A method which is executed by executing an application program by an information processing apparatus, the method comprising:
cooperating with print data generation software for generating print data to be printed by a plurality of printing devices of a plurality of vendors;
receiving first information about a printing device which is able to communicate with the information processing apparatus;
receiving second information indicating a remaining ink amount of the printing device; and
displaying, in a case where the received first information indicates a first type of an inkjet printing device, the remaining ink amount indicated by the received second information without causing a display to display the remaining ink amount in a case where the received first information indicates a second type of the inkjet printing device.

9. The method according to claim 8, wherein the first type of the inkjet printing device is a carriage type.

10. The method according to claim 9, wherein in the displaying, the remaining ink amount is displayed in a bar format on a screen.

11. The method according to claim 8, wherein the second type of the inkjet printing device is a tank type.

12. The method according to claim 8, wherein the first information is received according to a Get-Printer-Attributes operation of Internet Printing Protocol.

13. The method according to claim 8, wherein the first information is a name of the printing device.

14. The method according to claim 8, wherein the remaining ink amount is displayed on a status notification screen to provide a notification about a status of the printing device.

15. An information processing apparatus comprising:
one or more memories that store application program cooperating with print data generation software for generating print data to be printed by a plurality of printing devices of a plurality of vendors; and
a processor that causes, by executing the application program stored in the one or more memories, the information processing apparatus to function as:
a first receiving unit that receives first information about a printing device which is able to communicate with the information processing apparatus;
a second receiving unit that receives second information indicating a remaining ink amount of the printing device; and
a control unit that causes a display to display, in a case where the received first information indicates a first type of an inkjet printing device, the remaining ink amount indicated by the received second information without causing the display to display the remaining ink amount in a case where the received first information indicates a second type of the inkjet printing device.

* * * * *